United States Patent Office 3,440,016
Patented Apr. 22, 1969

3,440,016
COLORIMETRIC ANALYZER
Earl J. Serfass, St. Petersburg, Fla., assignor to Milton Roy Company, St. Petersburg, Fla., a corporation of Pennsylvania
Filed Sept. 26, 1966, Ser. No. 582,045
Int. Cl. G01n 33/18, 21/26
U.S. Cl. 23—253   10 Claims This invention relates to a colorimetric analyzer and, more particularly, to an automatic continuous analyzer for monitoring sample streams to signal an out-of-limit concentration of analyzed substance such as hardness in water.

Automatic chemical analyzers have means for adding an accurately controlled amount of reagent to a liquid sample to be analyzed. In colorimetric analyzers, a controlled amount of reagent added to the liquid sample will indicate the presence of the analyzed substance in the sample by color change. In prior art systems, the reagent may be added, for example, by burette manipulation or by the movement of a fixed volume device, such as a precision bore in the plug of a stop-cock.

Colorimetric analyzers may be used, for example, to continuously monitor the hardness of water in industrial applications. The analyzer provides an alarm indication when the hardness of the water exceeds a limit concentration. In such applications the analyzer must be simple, relatively inexpensive, and yet provide the required accuracy for this type analysis.

It is an important object of the present invention to provide such an analyzer. Further, it is an object of the present invention to provide an analyzer in which the reagent will flow into a mixing chamber only if there is a flow of liquid sample into the mixing chamber. If the supply of liquid sample is depleted, flow of the reagent ceases, thereby conserving reagent.

It is a further object of the present invention to provide a water hardness analyzer in which an alarm will be energized if the supply of reagent is depleted.

In accordance with one embodiment of the invention, the liquid sample and the reagent are mixed in a mixing chamber. The outlet of the mixing chamber is connected to a drain tube with a constant negative pressure head at the outlet thereof. The liquid sample is supplied to the mixing chamber at a constant positive pressure head. Reagent is supplied to the mixing chamber from a reagent bottle having an outlet supplying reagent at a zero pressure head. Capillaries having accurately determined inside diameters are connected between the sample and reagent supplies and the mixing chamber. The negative pressure at the outlet of the drain tube pulls accurately controlled amounts of reagent into mixture with the liquid sample. Since the negative pressure head is broken when the liquid sample supply is depleted, the flow of reagent to the mixing chamber will stop, thereby conserving reagent. Photoelectric means are positioned at the outlet of the drain tube for sensing changes in the color of the mixed sample and reagent. The photoelectric means will provide an indication of a change in the concentration of the analyzed substance; for example, an out-of-limits change in the hardness in water.

In such a water hardness detector, the photoelectric means will also provide an alarm when the reagent supply is depleted because the depletion in the reagent supply will cause a change in color of the mixture which will activate the alarm.

The foregoing and other objects, features, and advantages of the invention will be better understood from the following more detailed description and appended claims together with the drawings in which:

Figure 1:
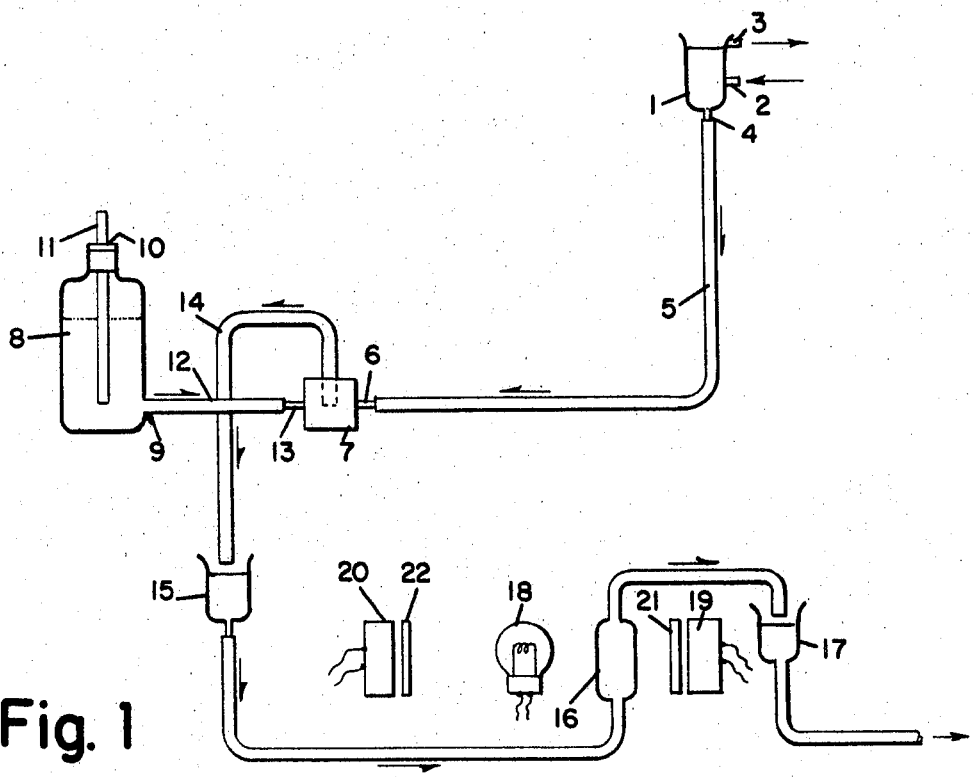
FIG. 1 is a flow diagram of the analyzer.

Referring now to the flow diagram of FIG. 1, liquid sample is supplied to the analyzer from a liquid sample vessel 1. The vessel 1 has an inlet 2 connected to a continuous supply of liquid sample, such as the water to be analyzed for hardness. An overflow outlet 3 is provided to maintain a constant level of the liquid in the vessel 1. Because the liquid level is constant, the pressure head at the outlet 4 will be constant. The outlet 4 is connected by tubing 5 to the capillary 6. The capillary 6 introduces a restriction in the reagent line thereby controlling the flow of sample entering the mixing chamber 7.

Reagent is supplied to the mixing chamber 7 from a reagent bottle 8. The reagent bottle 8 is of the type having an outlet 9 which supplies reagent at a zero pressure head. Such a bottle is sometimes referred to as a Mariotte bottle. The bottle 8 has a sealed top 10 through which a tube 11 extends. The tube 11 is open to the atmosphere at one end thereof. The other end of tube 11 is at the same depth in the bottle as the depth of outlet 9. Because of this, the pressure at the outlet 9 will be atmospheric. That is, the outlet 9 has a zero pressure head.

The outlet 9 of the reagent bottle is connected by tubing 12 to a capillary 13. The capillary 13 controls the flow of reagent to the mixing chamber 7.

A drain tube 14 is connected to an outlet in the top of the mixing chamber 7. The outlet of the drain tube is positioned a fixed distance below the mixing chamber 7 so that a constant negative pressure head is developed at the outlet of the mixing chamber.

It is important that the outlet of the mixing chamber be at the top thereof to prevent the accumulation of air bubbles which tend to break the negative pressure head. The outlet of drain tube 14 empties into a collecting vessel 15 from which the mixed liquid sample and reagent flows through sample cell 16 to the drain vessel 17. The sample cell 16 is positioned between a lamp 18 and the photoconductive cell 19. The photoconductive cell 19 is connected with a reference photoconductive cell 20 in opposing legs of a balanced A.C. bridge. In order to render the photoconductive cells 19 and 20 sensitive to the wavelengths required for proper operation of the system, light filters 21 and 22 are provided. As will be subsequently described, when the bridge is balanced there is an indication that the monitored concentration is within the desired limits. However, when the monitored concentration exceeds the desired limits, the bridge becomes unbalanced and an alarm is energized.

Figure 2A:
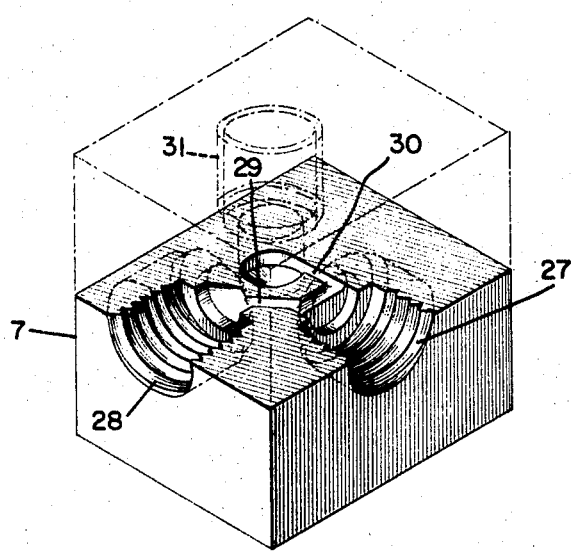
FIG. 2a is a cut-away perspective view of the mixing chamber.
Figure 2:
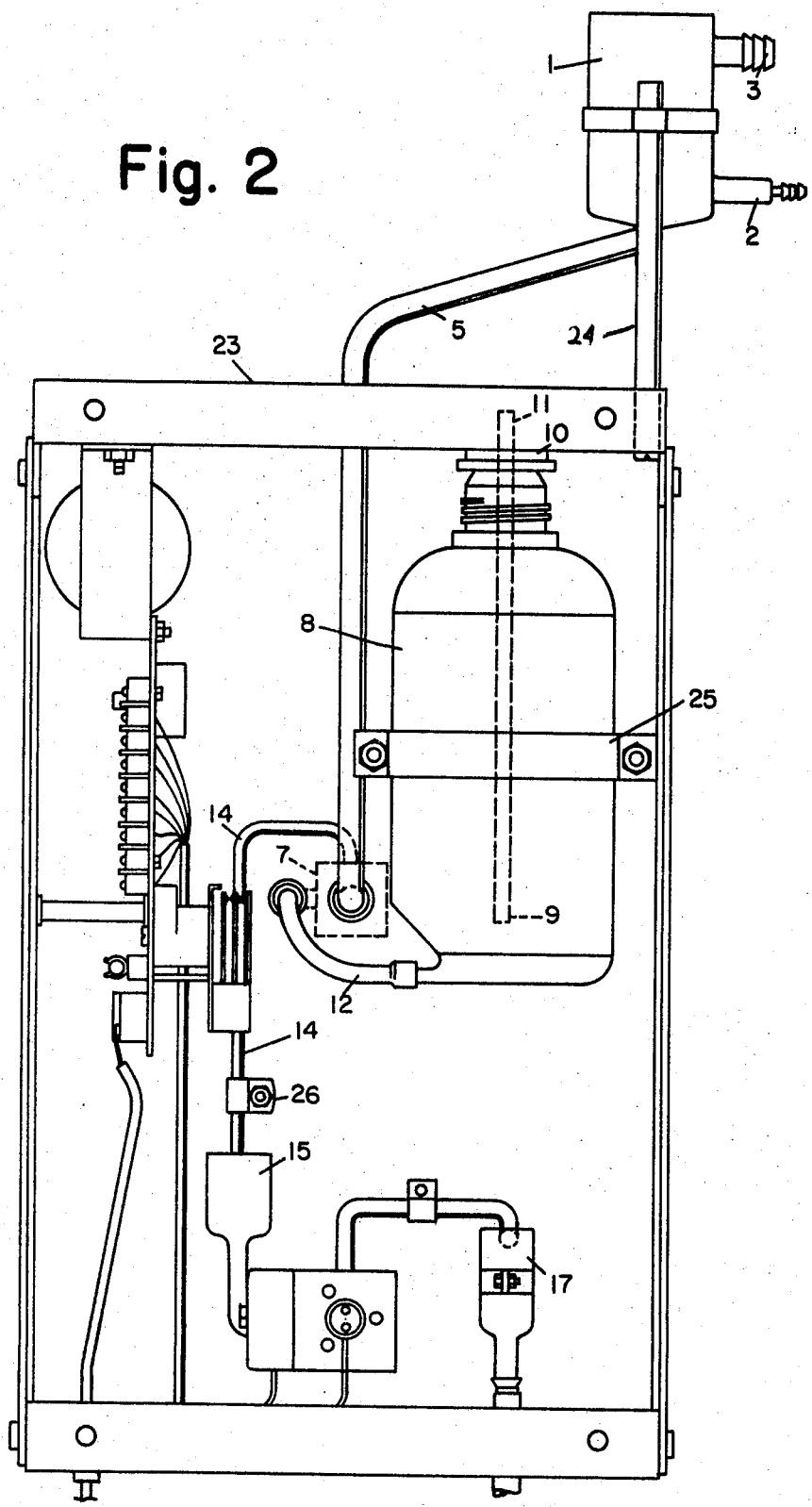
FIG. 2 is a rear view of the hydraulic components of the analyzer.

A better understanding of the construction of the analyzer is obtained from FIG. 2 showing an actual embodiment of the invention wherein like reference numerals have been used to denote like elements in FIG. 1. The analyzer is contained in a compact case 23 adapted to be mounted on a wall or bench in a facility wherein the hardness of water is to be tested, for example, in an electrical power station. The liquid sample is supplied to the liquid sample vessel 1 mounted by bracket 24 at a fixed height above the mixing chamber 7. In one embodiment of the invention, the liquid sample vessel 1 is fixed at 16" above the mixing chamber.

The reagent bottle 8 is similarly secured to the case 23 by a mounting bracket 25. In one embodiment of the invention, a one liter polyethylene bottle was used; such a bottle contains enough reagent for one week of continuous operation.

One reagent suitable for use in testing the hardness of water is Eriochrome Black "T" (EBT) dye. Eriochrome Black "T" reacts with magnesium to produce Eriochrome Red. The intensity of this color change is sensed by the photoelectric device. The reagent suitable for use in a water hardness detector is commercially available; for example, the Milton Roy Company Reagent 111C.

The tubing 5 supplies the sample to the mixing chamber at a constant pressure head of 16". Reagent is supplied through tubing 12 to the other capillary in the mixing chamber at a zero pressure head. The outlet of the mixing chamber 7 is connected to the drain tube 14 which is securely clamped to casing 23 by the clamp 26. In an actual embodiment of the invention the drain tube was clamped in a position such that the lower end was 6½" below the mixing chamber 7. The negative pressure at the outlet of the drain tube 14 provides the suction in the mixing chamber 7 for the reagent flow. Although not shown in FIG. 2, a capillary is inserted in tubings 5 and 12 to accurately control the flow of liquid sample and reagent. In one embodiment of the invention the capillaries were each 1½" long; .015" inside diameter; and .218" outside diameter. With this size capillary and with the pressure heads previously described, the liquid sample flow rate is approximately 5 milliliters per minute.

The drain tube 14 empties into the collecting vessel 15 before the liquid flows through the sample cell. Because of this, there is no siphon leg in the liquid flow path out of the mixing chamber. By terminating the drain tube 14 before the liquid enters the sample cell, air bubbles are released so that they do not pass through the light beam, and the mixing of the reagent and sample is completed.

The mixing chamber 7 is shown in more detail in FIG. 2a. The mixing chamber is constructed from a clear epoxy blank, cast in an individual mold so that only one face requires machining. Liquid sample under pressure enters the mixing chamber at the inlet 27 and the reagent is pulled by suction into the mixing chamber through the inlet 28. The reagent and sample are premixed in small drilled holes 29 and 30 before being admitted into the mix cell 31. Liquid is taken off of the top of the cell 31 in order to carry along any air bubbles which might be present in the liquid.

Figure 3:
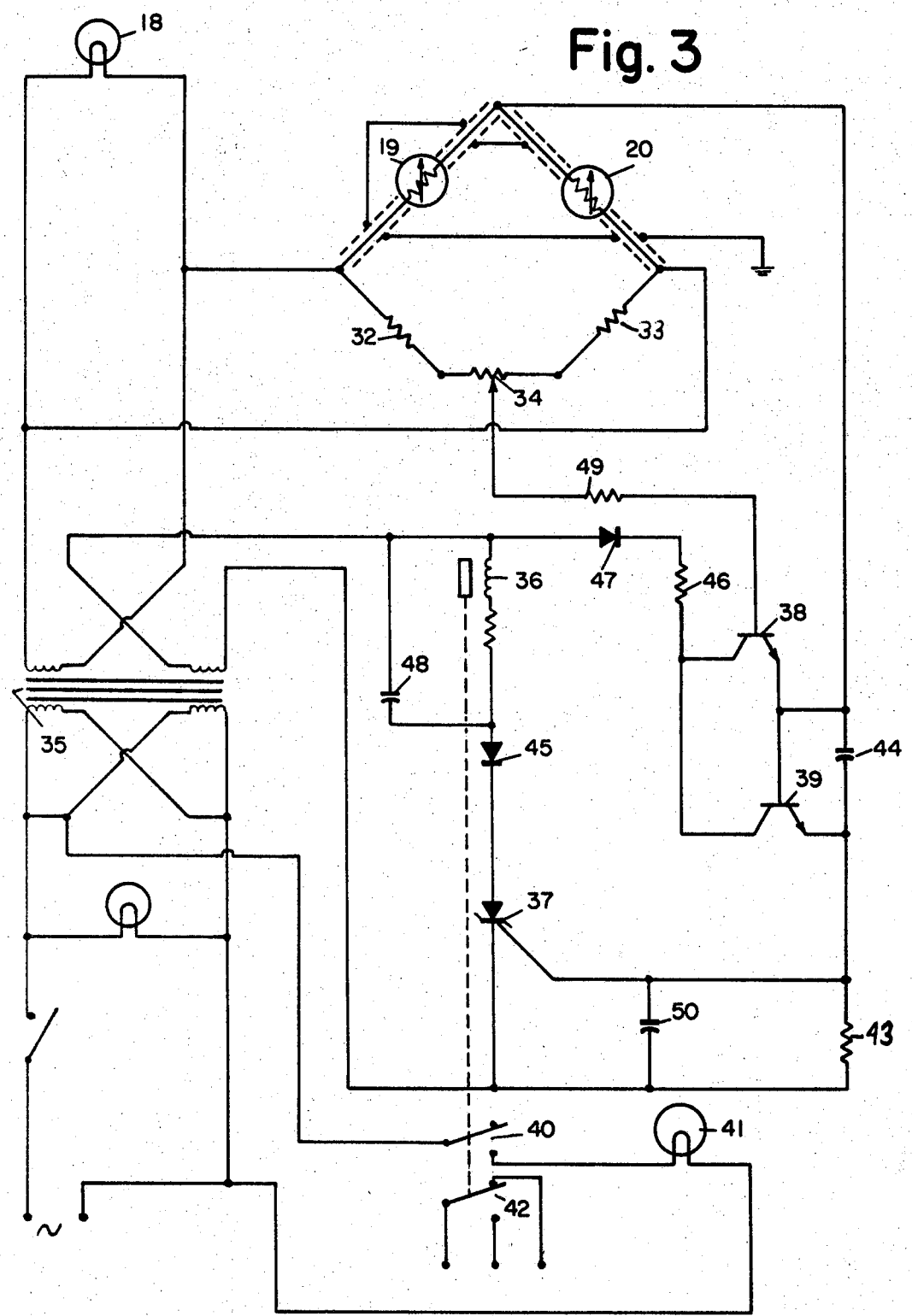
FIG. 3 is a circuit diagram of the electronic system.

Referring now to FIG. 3, there is shown the photoconductive cell circuitry. The photoconductive cells 19 and 20 are hermetically sealed, cadmium sulphide type photoconductive cells. The cells are in opposing legs of a balanced A.C. bridge including resistors 32 and 33 and a balancing potentiometer 34. The lamp 18 is a 20-volt prefocussed illuminator lamp operating at 6 volts for reduced intensity, lower heat and longer life.

A dual output transformer 35 provides equal 12-volt A.C. circuits for the lamp 18, for the bridge, and for the trigger circuit of alarm relay 36. When the bridge is balanced, the output is insufficient to trigger the silicon-controlled rectifier 37 and the relay 36 remains open. When water hardness exceeds a predetermined set limit, for example, three parts per million hardness, the unbalance of the bridge becomes great enough to trigger the silicon-controlled rectifier 37 which passes sufficient current to energize relay 36.

In order to amplify the bridge circuit signal, two transistors 38 and 39 are connected between the contact of the balancing potentiometer 34 and the gate of silicon-controlled rectifier 37. These transistors are necessary to provide a stable and sensitive circuit and, in addition, they eliminate hysteresis in the triggering of the silicon-controlled rectifier. That is, in the absence of such transistors, increasing hardness in the water sample will cause the silicon-controlled rectifier to fire at a relatively high water hardness value, but once triggered, the heat generated in the silicon-controlled rectifier will change the characteristics so that it will remain triggered until the water hardness drops to a much lower value. This type of hysteresis is a function of temperature and is greater when the silicon-controlled rectifier is triggered for longer periods of time.

The relay 36 is provided with double-pole double-throw contacts. One set of contacts 40 is used to energize the alarm light 41 to provide an indication that the water hardness has exceeded its limit. The other set of contacts 42 may be connected to a remote alarm indication. A complete listing of component values suitable for use in a particular circuit is provided below. It will be understood that these component values are not to be considered limiting of the invention but are merely provided by way of illustration.

*Component values*

| | | |
|---|---|---|
| 19—photoconductive cell | | Clarex CL–605L |
| 20—photoconductive cell | | Clarex CL–605L |
| 32—resistor | ohms | 3300 |
| 33—resistor | do | 3300 |
| 34—balancing potentiometer | do | 250 |
| 36—alarm relay | ohms, 5 w | 10 |
| 37—rectifier | | 2N2323A |
| 38—transistor | | 2N2924 |
| 39—transistor | | 2N2924 |
| 43—resistor | ohms | 10K |
| 44—capacitor | $\mu f$ | .10 |
| 45—diode | | 1N2069 |
| 46—resistor | ohms | 2.2K |
| 47—diode | | 1N2069 |
| 48—capacitor | $\mu f$., 25 v. DC | 500 |
| 49—resistor | ohms | 68K |
| 50—capacitor | $\mu f$ | .05 |

While a particular embodiment of the invention has been shown and described, it will, of course, be understood that various modifications may be made without departing from the true spirit and scope of the invention. The appended claims, are, therefore, intended to cover any such embodiments.

What is claimed is:

1. A chemical analyzer for continuously mixing accurately controlled amounts of liquid sample and reagent in a manner such that the flow of reagent will be stopped when the supply of sample is depleted, said analyzer comprising:
   a reagent bottle having an outlet supplying reagent at zero pressure head,
   a liquid sample vessel having an outlet supplying liquid sample at a constant pressure head,
   a mixing chamber,
   a first capillary of accurately determined inside diameter connected between the outlet of said reagent bottle and said mixing chamber,
   a second capillary of accurately determined inside diameter connected between the outlet of said liquid sample vessel and said mixing chamber, and
   a drain tube having one end connected to an outlet of said mixing chamber and having the other end positioned at a fixed distance below said mixing chamber whereby the negative pressure head at said other end of said drain tube provides suction for mixing accurately controlled amounts of liquid sample and reagent in said mixing chamber.

2. The analyzer recited in claim 1 further including:
   photoelectric sensing means positioned at the outlet of said drain tube for sensing changes in the color of the mixed liquid sample and reagent.

3. The analyzer recited in claim 2 wherein said outlet of said mixing chamber is at the top of said mixing chamber whereby small air bubbles in said mixing chamber are immediately carried away to prevent the formation of an air pocket which would break said negative pressure.

4. The analyzer recited in claim 3 further including:
   a collecting vessel open to atmospheric pressure positioned between the outlet of said drain tube and said photoelectric sensing means.

5. The analyzer recited in claim 2 and:
a sample cell, the liquid from the outlet of said drain tube being supplied to said sample cell,
said photoelectric means including:
   a light source,
   a first photoconductive device connected in one leg of a bridge circuit, said sample cell being positioned between said light source and said first photoconductive device, and
   an alarm connected to said bridge circuit so that a change in the color of the liquid in said sample cell changes the conductivity of said first photoconductive device thereby actuating said alarm when the concentration of a monitored substance in said liquid sample exceeds a preset limit.

6. The analyzer recited in claim 5 and a second photoconductive device, said second photoconductive device being positioned adjacent said light source to serve as a reference, said first and second photoconductive devices being connected in said bridge circuit so that the output across said bridge circuit varies in accordance with variations in the color of the liquid in said sample cell.

7. The analyzer recited in claim 6 and an alarm relay and means to actuate said alarm relay in response to said output across said bridge circuit.

8. The analyzer recited in claim 7 wherein said means to actuate said alarm relay includes a silicon-controlled rectifier having an anode and cathode connected in series with the coil of said alarm relay and means for applying the output across said bridge circuit to the gate of said silicon-controlled rectifier.

9. The analyzer recited in claim 8 wherein said means for applying the output across said bridge circuit to the gate of said silicon-controlled rectifier includes a transistor amplifier stage providing amplification of the output across said bridge circuit thereby improving the stability of the triggering level of said silicon-controlled rectifier.

10. A water hardness detector of the type in which reagent mixed with water in accurately controlled amounts changes color to indicate an out-of-limits concentration of hardness in water comprising:
a reagent bottle having an outlet supplying said reagent at zero pressure head,
a liquid sample vessel, a source of the water to be analyzed being supplied to said liquid sample vessel, said liquid sample vessel having an outlet supplying said water at a constant pressure head,
a mixing chamber,
a first capillary of accurately determined inside diameter connected between the outlet of said reagent bottle and said mixing chamber,
a second capillary of accurately determined inside diameter connected between the outlet of said liquid sample vessel and said mixing chamber,
a drain tube having one end connected to an outlet of said mixing chamber and having the other end positioned at a fixed distance below said mixing chamber, the negative pressure head at the other end of said drain tube providing suction for mixing accurately controlled amounts of water and reagent in said mixing chamber so that when the supply of water in said liquid sample vessel is depleted, the flow of reagent to said mixing chamber will be stopped,
photoelectric sensing means positioned at the outlet of said drain tube for sensing changes in the color of the mixed water and reagent, and
an alarm, the output of said photoelectric sensing means being applied to said alarm to actuate it when the color change of the mixed water and reagent indicates an out-of-limits hardness concentration in said water and when an absence of color indicates that the supply of reagent is depleted.

References Cited

UNITED STATES PATENTS

| 2,063,140 | 12/1936 | Allison. | |
| 2,080,613 | 5/1937 | Lange. | |
| 3,226,195 | 12/1965 | Nichols et al. | 23—230 |

MORRIS O. WOLK, *Primary Examiner.*

R. M. REESE, *Assistant Examiner.*

U.S. Cl. X.R.

88—14; 250—218; 340—228, 236